US007752350B2

(12) United States Patent
Brokenshire et al.

(10) Patent No.: US 7,752,350 B2
(45) Date of Patent: Jul. 6, 2010

(54) SYSTEM AND METHOD FOR EFFICIENT IMPLEMENTATION OF SOFTWARE-MANAGED CACHE

(75) Inventors: Daniel Alan Brokenshire, Round Rock, TX (US); Michael Norman Day, Round Rock, TX (US); Barry L Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 11/678,141

(22) Filed: Feb. 23, 2007

(65) Prior Publication Data

US 2008/0209127 A1 Aug. 28, 2008

(51) Int. Cl.
G06F 13/28 (2006.01)
G06F 12/00 (2006.01)
G06F 9/34 (2006.01)
(52) U.S. Cl. .................. 710/22; 711/138; 711/204; 712/226; 712/233
(58) Field of Classification Search ................ None
See application file for complete search history.

(56) References Cited

U.S. PATENT DOCUMENTS

| 5,544,342 | A  | * | 8/1996 | Dean ........................ 711/119 |
| 6,016,532 | A  |   | 1/2000 | Lynch et al. ................ 711/118 |
| 7,076,640 | B2 | * | 7/2006 | Kadambi .................... 712/244 |
| 7,353,445 | B1 | * | 4/2008 | Barreh et al. ............... 714/758 |
| 2002/0112142 | A1 | * | 8/2002 | Emer et al. .................... 712/8 |
| 2003/0033480 | A1 | * | 2/2003 | Jeremiassen ................. 711/118 |
| 2004/0044850 | A1 | * | 3/2004 | George et al. ............... 711/131 |
| 2004/0139283 | A1 | * | 7/2004 | Arimilli et al. .............. 711/146 |
| 2004/0139295 | A1 | * | 7/2004 | Arimilli et al. .............. 711/207 |
| 2005/0216610 | A1 | * | 9/2005 | Johns et al. ................... 710/22 |
| 2006/0123405 | A1 |   | 6/2006 | O'Brien et al. ............. 717/150 |
| 2006/0155886 | A1 |   | 7/2006 | da Silva et al. ................. 710/5 |

OTHER PUBLICATIONS

Hennessey et al., "Computer Architecture: a quantitative approach" Edition 3, Published 2003. Particularly pp. 340-350. Also Available for viewing on Google Books using the search term: how to use conditional move instruction.*

* cited by examiner

Primary Examiner—Henry W. H. Tsai
Assistant Examiner—Michael Sun
(74) Attorney, Agent, or Firm—VanLeeuwen & VanLeeuwen; Matthew B. Talpis

(57) ABSTRACT

A system and method for an efficient implementation of a software-managed cache is presented. When an application thread executes on a simple processor, the application thread uses a conditional data select instruction for eliminating a conditional branch instruction when accessing a software-managed cache. An application thread issues a conditional data select instruction (DMA transfer) after a cache directory lookup, wherein the size of the requested data is dependent upon the outcome of the cache directory lookup. When the cache directory lookup results in a cache hit, the application thread requests a transfer of zero bits of data, which results in a DMA controller (DMAC) performing a no-op instruction. When the cache directory lookup results in a cache miss, the application thread requests a data block transfer the size of a corresponding cache line.

27 Claims, 10 Drawing Sheets

300

```
idx - cache_lookup(addr);                              — 310
missing = (cache_dir[idx] != addr);                    — 320
cache_dir[idx] = addr;                                 — 330
ls = &cache_mem[idx * cacheline_size];                 — 340
size = (missing) ? cacheline_size : 0                  — 350
query_type = (missing) ? WAIT_ALL : IMMEDIATE;         — 360
dma(ls, addr, size, DMA_GET);                          — 370
dma_wait(query_type);                                  — 380
return ls;                                             — 390
```

FIG. 3

SYSTEM AND METHOD FOR EFFICIENT IMPLEMENTATION OF SOFTWARE-MANAGED CACHE

BACKGROUND OF THE INVENTION

1. Technical Field

The present invention relates to a system and method for efficient implementation of software-managed cache. More particularly, the present invention relates to a system and method for using a conditional data select instruction and a zero-length data transfer operation for eliminating a conditional branch instruction in a software managed cache.

2. Description of the Related Art

Certain processing tasks involve multiple references to data elements that are confined to a relatively small data block (e.g., cache line), such as encoding or decoding video information. For example, video software may repeatedly reference incoming color information from a "macro-block" and, in this case, the references are considered to have a "strong spatial locality."

In addition, certain processing tasks involve a series of read-only references to a particular data block, such as rendering software generating a texture image. For example, the rendering software may sample and filter (average) multiple nearby "texels." Again, such references are considered to have strong spatial/temporal locality since multiple nearby texels are referenced one after another in order to perform the filtering operation.

One approach to handle the above processing tasks is to use a processor that is able to 1) execute software that supports logically complex tasks, and 2) be fast/capable enough to process significant amounts of data. Such a processor, however, may be large, complex, include a coherent data cache, and operate at a high frequency. Unfortunately, these processors are not typically power and cost effective.

Another approach to handle such tasks is to divide the processing workload among one or more "simple processing elements," each of which having a small but high speed local memory, coherent asynchronous DMA capability, a large register file, and a SIMD ISA in order to allow high compute performance at improved size/power efficiency. To achieve this higher performance and efficiency, however, simple processors discard much of the complexity of a larger processing core by eliminating hardware caches, load/store capabilities, and branch prediction logic. As such, simple processors may use a "software managed cache" that uses a set of data blocks for reducing latency from main memory to local memory. The software-managed cache may be implemented as direct mapped, n-way set associative, or fully associative, depending upon requirements.

For data references to a software-managed cache, the cache occasionally misses, such as during the cache's initial state. When a cache miss occurs, existing art "conditionally branches" to a "cache miss handler," which updates the cache with the requested data block. A challenge found, however, is that conditionally branching to a cache miss handler creates performance bottlenecks for a simple processing element because the simple processor does not have advanced branch prediction logic that is often part of a more complex processor. Therefore, the simple processor stalls in order to fetch the next instruction because the branch target is typically not in line with the current instruction stream.

Existing art may insert branch hint instructions to instruct the simple processor to prefetch instructions. A challenge found, however, is that this approach is not effective when multiple conditional branch instructions follow closely one after another, such as in the case of successive cache queries (i.e. video processing and texture mapping).

What is needed, therefore, is a system and method that effectively handles cache misses in a simple processing element.

SUMMARY

It has been discovered that the aforementioned challenges are resolved using a system and method for using a conditional data select instruction for eliminating a conditional branch instruction in a software managed cache. In order to eliminate the use of a conditional branch instruction, an application thread invokes a conditional data select instruction after a cache directory lookup. The conditional data select's requested data size is dependent upon the outcome of the cache directory lookup. When the cache directory lookup results in a cache hit, the application thread requests a transfer of zero bits of data, which results in a DMA controller (DMAC) performing a no-op instruction. When the cache directory lookup results in a cache miss, the application thread requests a data block transfer with a size corresponding to the size of a cache line.

A computer system includes a simple processor, which is a high-performance processing element without complex features typically found on larger processing cores (e.g., no hardware cache or branch prediction logic). As such, the simple processor uses a software-managed cache for caching data to application threads. The software-managed cache comprises a directory and cache lines. The directory includes directory entries that contain addresses, and the cache lines include data blocks corresponding to the addresses.

As the application thread executes, the application thread (e.g., embedded pseudo-code) requests data blocks from cache lines included in the software managed cache. When this occurs, the application thread issues a directory lookup, which looks up a line address in a directory entry located in the software-managed cache. The application thread determines whether the directory lookup resulted in a cache hit or a cache miss.

Regardless of directory lookup outcome, the application thread always issues a DMA request. The DMA request includes a "requested size," which is the size of the amount of data for the DMA controller (DMAC) to retrieve from system memory. When a cache miss occurs, the requested size is the size of the requested cache line, such as 128 bytes. The DMAC receives the DMA request and proceeds to retrieve a data block from system memory whose size is based upon the requested size. The DMAC proceeds to store the data block in the corresponding cache line included in the software-managed cache. Once stored, the application thread executes a cache line read, which reads the data block from the software-managed cache.

When the directory lookup results in a cache hit, the application thread still issues a DMA request, but its requested size equals zero. The DMAC receives the DMA request and detects that the requested size is zero. As a result, the DMAC performs a no-op instruction instead of transferring data from system memory to the software-managed cache. In addition, since the directory lookup resulted in a cache hit, the application thread immediately executes a cache line read to read the data block from the corresponding cache line instead of waiting for the completion of a DMA transfer.

In one embodiment, the invention described herein may be used to eliminate conditional branches for casting out dirty data blocks in a read/write software managed cache. In this embodiment, an application thread detects a cache miss, selectively casts out the prior data block, and stores the data block from main memory into the corresponding cache line with respect to read operations and write operations.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 3 is a user interface window including pseudo-code corresponding to the invention described herein;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
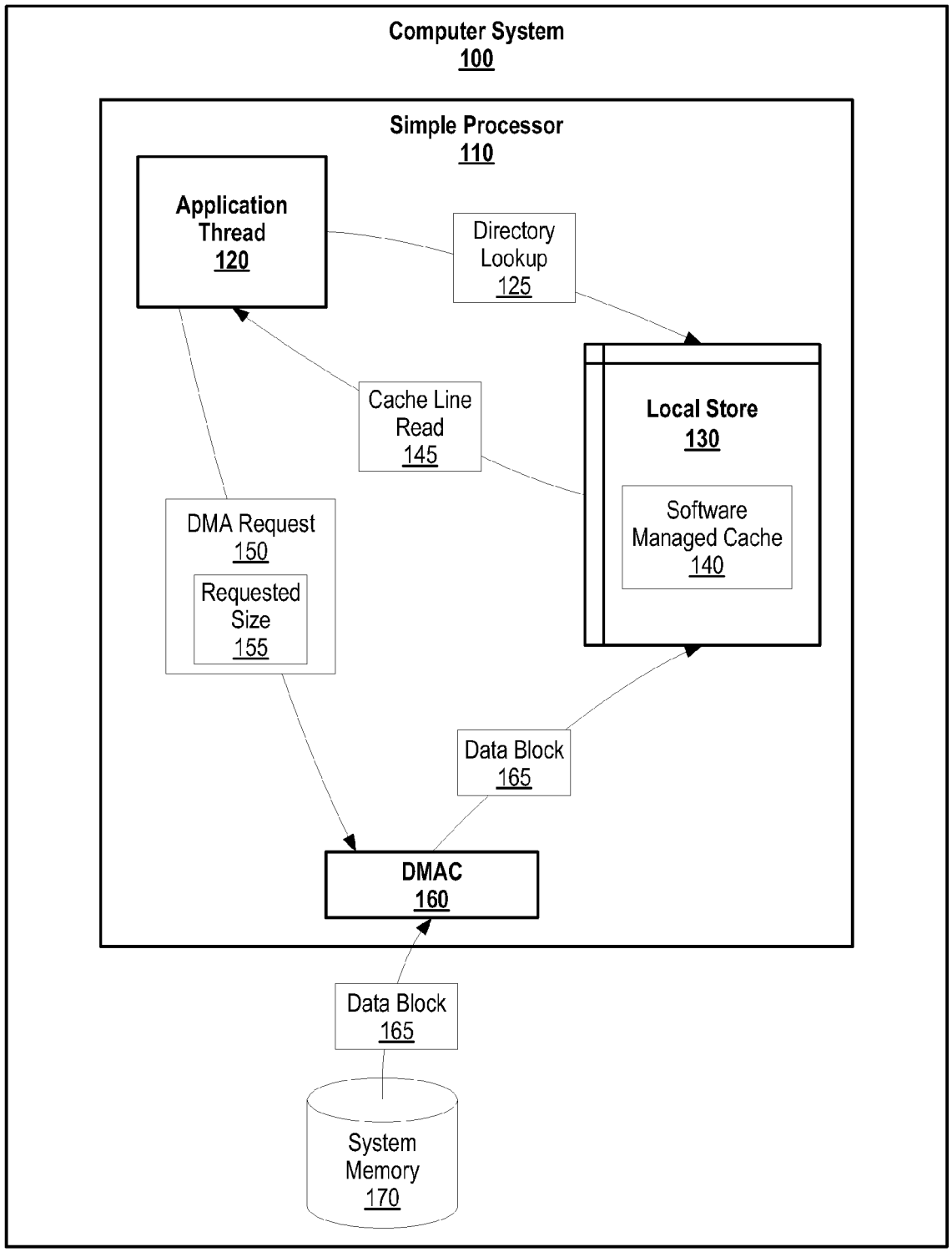
FIG. 1 is a diagram showing an application thread always initiating a data transfer after a cache directory lookup, regardless of whether the cache directory lookup results in a cache hit or a cache miss.

FIG. 1 is a diagram showing an application thread always initiating a data transfer after a cache directory lookup, regardless of whether the cache directory lookup results in a cache hit or a cache miss. In order to eliminate the use of a conditional branch instruction, application thread 120 invokes a conditional data select instruction (DMA transfer) after a cache directory lookup, wherein the size of the requested data is dependent upon the outcome of the cache directory lookup. When the cache directory lookup results in a cache hit, application thread 120 requests a transfer of zero bits of data, which results in DMA controller (DMAC) 160 performing a no-op instruction. When the cache line lookup results in a cache miss, application thread 120 requests a data block transfer the size of a corresponding cache line.

Computer system 100 includes simple processor 110, which is a high-performance processing element without complex features typically found on larger processing cores, such as a hardware cache and branch prediction logic. As such, simple processor 110 uses software-managed cache 140 for caching data to application thread 120. Software managed cache 140 comprises a directory and cache lines. The directory includes directory entries that contain addresses, and the cache lines include data blocks corresponding to the address.

Application thread 120 executes on simple processor 110, which may be a thread for texturing an image for a rendering software application. Pseudo-code resides within application thread 120 for requesting data blocks from software-managed cache 140 (see FIG. 3 and corresponding text for further details regarding a pseudo-code embodiment).

As application thread 120 executes, application thread 120 requests data blocks from cache lines included in software managed cache 140. When this occurs, application thread 120 issues directory lookup 125, which looks up a line address in a directory entry located in software managed cache 140. Application thread 120 determines whether directory lookup 125 resulted in a cache hit or a cache miss. As those skilled in the art can appreciate, a cache hit occurs when the directory entry includes the expected line address, and a cache miss occurs with the directory entry does not include the expected line address.

Regardless of directory lookup outcome, application thread 120 invokes DMA request 150. DMA request 150 includes requested size 150, which is the size of the amount of data for DMA Controller (DMAC) 160 to retrieve from system memory 170. When a cache miss occurs, requested size 155 is the size of the requested cache line, such as 128 bytes. DMAC 160 receives DMA request 150 and proceeds to retrieve data block 165 from system memory 170, whose size is based upon requested size 155. DMAC 160 proceeds to store data 165 in the corresponding cache line included in software-managed cache 140. Once stored, application thread 120 executes cache line read 145, which reads data block 165 from software managed cache 140.

When directory lookup 125 results in a cache hit, application thread 120 still issues DMA request 150, but requested size 155 equals zero. DMAC 160 receives DMA request 150 and detects that requested size 155 is zero. As a result, DMAC 160 performs a no-op instruction instead of transferring data from system memory 170 to local store 130. In addition, since directory lookup resulted in a cache hit, application thread 120 immediately executes cache line read 145 to read the data block from the corresponding cache line instead of waiting for the completion of a DMA transfer.

Figure 2:
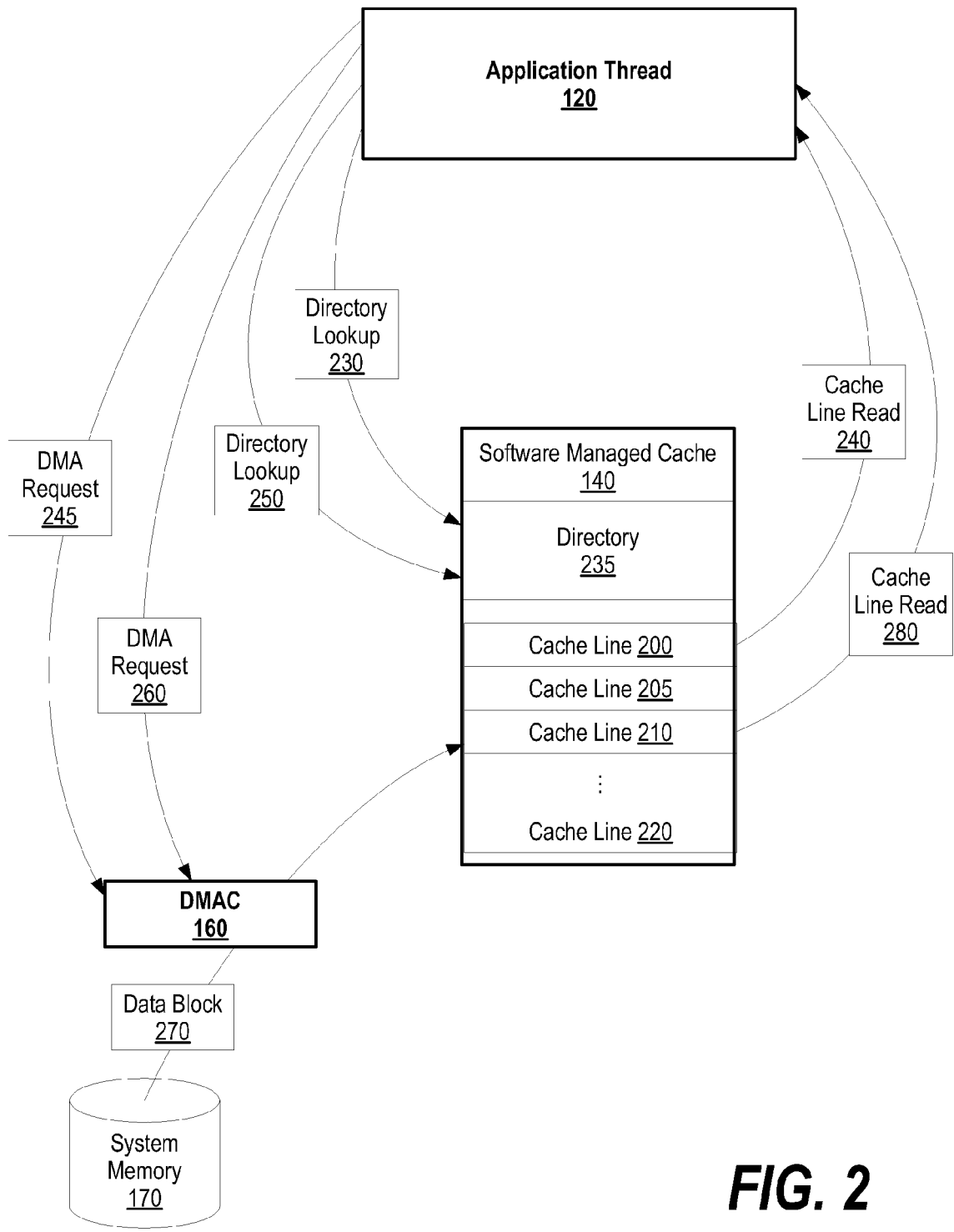
FIG. 2 is a diagram showing an application thread issuing DMA requests and reading data blocks from cache lines.

FIG. 2 is a diagram showing an application thread issuing DMA requests and reading data blocks from cache lines. Application thread 120 has strong temporal and special locality references that are inherent in certain types of processing tasks, and thus uses software managed cache 140 to efficiently read data. For example, application thread 120 may be a video processing thread or textural mapping thread. Application thread 120 and software-managed cache 140 are the same as that shown in FIG. 1.

Application thread 120 initiates and identifies a requirement for a data block. In turn, application thread 120 performs directory lookup 230 to identify whether the data block's corresponding line address is included in directory 235, signifying that that data block is included in one of cache lines 200-220.

Application thread 120 determines that directory lookup 230 results in a "cache hit" and, therefore, application thread 120 includes a requested size of zero bits into DMA request 240 and sends DMA request 245 to DMA controller (DMAC) 160. DMAC 160 receives DMA request 245, identifies that the requested size is zero bits, and performs a no-op instruction. In addition, since application thread 120 determined a cache hit, application thread 120 performs cache line read 240 to read the data block from cache line 200 without waiting for a DMA transfer operation completion. DMAC 160 is the same as that shown in FIG. 1.

Application thread 120's next line address lookup is directory lookup 250. This time, application thread 120 determines that directory lookup 250 results in a cache miss. As such, application thread 120 includes a requested size equal to cache line 210's size (e.g., 128 bytes) into DMA request 260. In turn, DMAC 160 retrieves data block 270 from system memory 170, and stores it in cache line 210. Once the DMA transfer completes, application thread 120 performs cache line read 280, which reads data block 270 from cache line 210. System memory 170 is the same as that shown in FIG. 1.

FIG. 3 is a user interface window including pseudo-code corresponding to the invention described herein. Window 300 includes code lines 310 through 380 that are one embodiment of the invention described herein.

Code line 310 determines which cache directory entry for which an address belongs corresponding to a cache request. This is typically a simple hash function, but may be elaborated as required. For example, for systems that use 128 bit cache lines, the last seven bits of the address may be concatenated. Code line 320 determines whether the address from code line 310 is in a directory entry located in a cache directory. When the address is in the directory entry, a cache hit occurs. When the address is not in the directory, a cache miss occurs.

Code line 330 sets the directory entry to "addr," in effect casting out previous contents if any. This is performed due to the fact that when a cache miss occurs, a DMA transfer transfers a data block to the corresponding cache line and, therefore, the correct address is entered into the directory entry. Code line 340 computes the local memory address for the corresponding cache line.

Code line 350 sets a retrieval size based upon the outcome of code line 320 above. When the address is in the directory (cache hit), code line 350 sets the retrieval size to zero. When the address is not in the directory (cache miss), code line 350 sets the retrieval size to "cacheline_size," which is the size of the cache line, such as 128 bytes.

Code line 360 sets a query type based upon the outcome of code line 320 above. When the address is in the directory (cache hit), code line 350 sets the query type to "IMMEDIATE," which instructs the application thread to immediately transfer a data block from the cache line (code line 380 below). When the address is not in the query type to "WAIT_ALL," which instructs the application thread to wait until the DMA transfer to the cache line is complete before transferring the data block from the cache line (code line 380 below).

Code line 370 initiates an asynchronous operation to transfer data from a main storage area to a cache line. Code line 370 includes "size," which is the size that was set in code line 350 above, that is the amount of data to transfer to the code line. Meaning, if code line 320 determines a cache hit, the size is zero, and if code line 320 determines a cache miss, the size is "cacheline_size" (the size of the cache line).

Code line 380 waits for the DMA operation in code line 370 above to complete based upon the "query_type" that was set in code line 360 above. Meaning, if code line 320 determines a cache hit, query_type is "IMMEDIATE" and, therefore, the application thread does not wait until the DMA transfer completion, but rather immediately reads a data block from the cache line. When, code line 320 determines a cache miss, query_type is "WAIT_ALL" and, therefore, the application thread waits until the DMA transfer completes, and then reads the data block from the cache line. The application thread returns to regular processing at code line 390.

Figure 4:
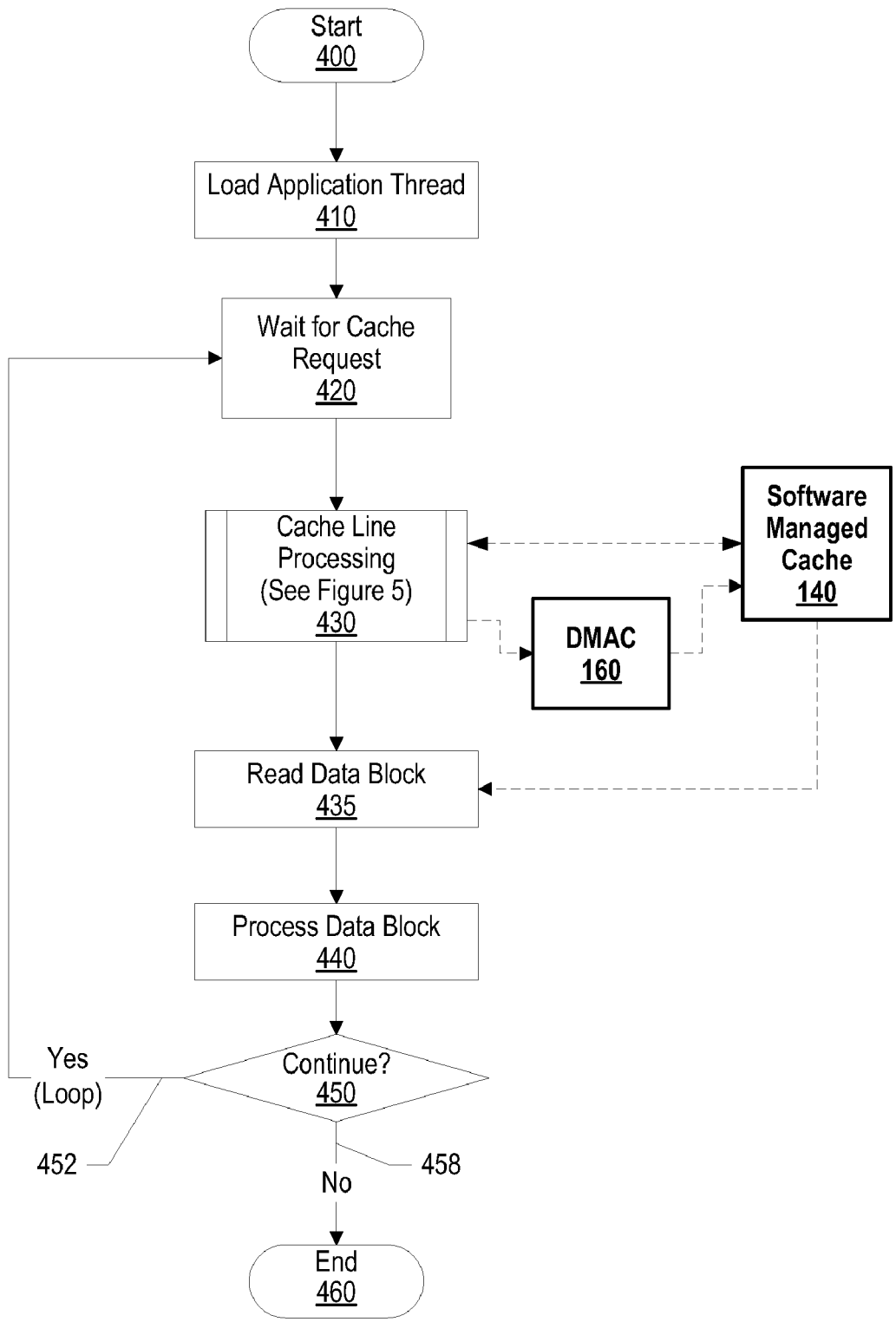
FIG. 4 is a high-level flowchart showing steps taken in requesting and processing data blocks from corresponding cache lines.

FIG. 4 is a high-level flowchart showing steps taken in requesting and processing data blocks from corresponding cache lines. Processing commences at 400, whereupon processing loads an application thread onto a simple processor at step 410. For example, the application thread may be a video thread that repeatedly references incoming color information from a "macro block."

At step 420, processing waits for a cache request from the application thread. When the application thread requests a data block from software managed cache 140, processing performs a line address directory lookup to determine a cache hit or cache miss; always initiates a DMA data transfer to DMAC 160 regardless of directory lookup's outcome; and reads a data block from the cache line (pre-defined process block 430, see FIG. 5 and corresponding text for further details). Software managed cache 140 and DMAC 160 are the same as that shown in FIG. 1.

At step 435, processing reads the requested data block from software-managed cache. When the directory lookup results in a cache miss, processing waits for DMAC 160 to transfer data from system memory to software managed cache. When the directory lookup results in a cache hit, processing immediately reads the data block from software managed cache 140 and does not wait until for DMA transfer completion (see FIG. 5 and corresponding text for further details).

A determination is made as to whether to continue processing the application thread (decision 450). If processing should continue, decision 450 branches to "Yes" branch 452 that loops back to wait and processes more data requests. This looping continues until processing should terminate, at which point decision 450 branches to "No" branch 458 whereupon processing ends at 460.

Figure 5:
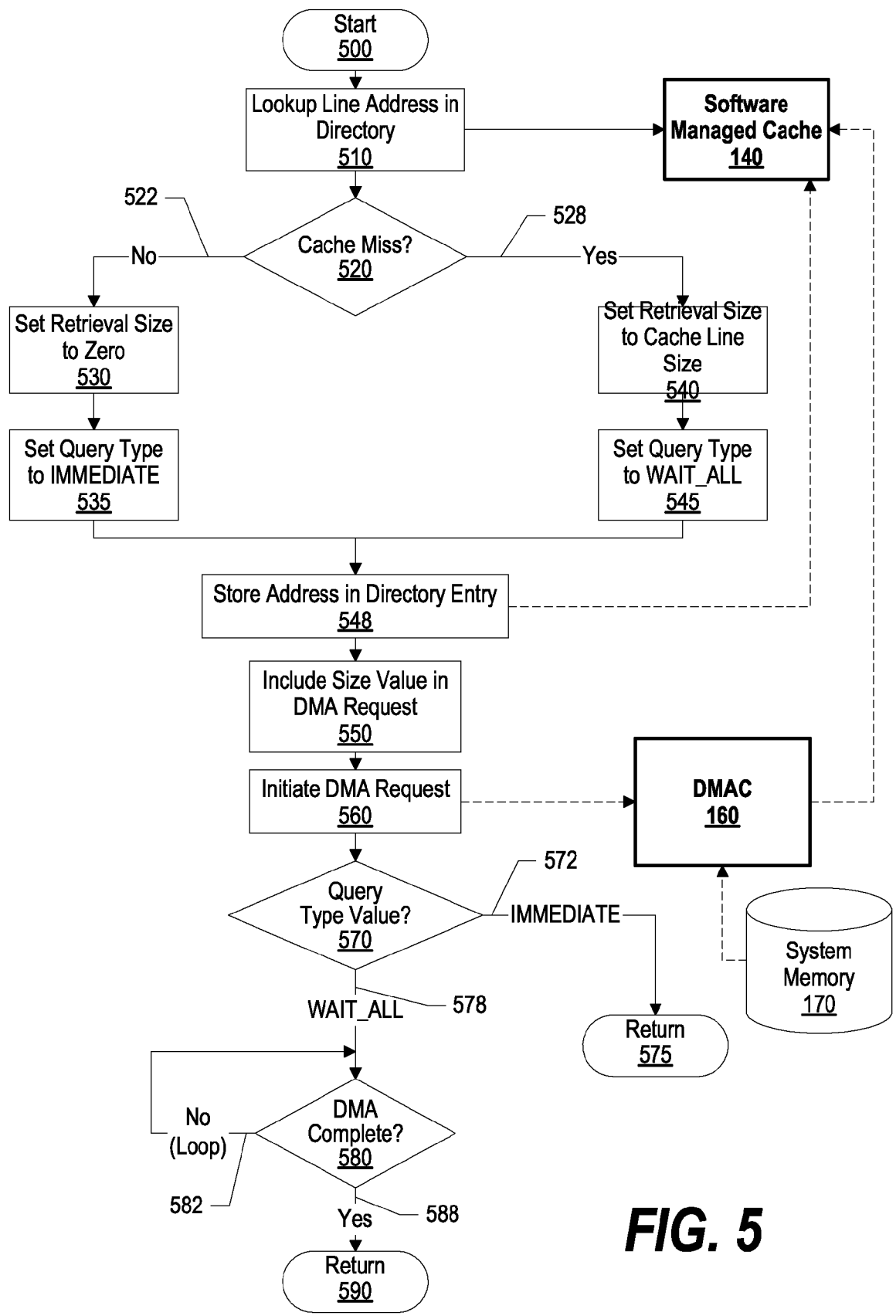
FIG. 5 is a flowchart showing steps taken in processing a cache request.

FIG. 5 is a flowchart showing steps taken in processing a cache request. An application thread issues a DMA request that includes a "requested size" for a data transfer, wherein the requested size is based upon the application thread's determination as to whether a corresponding line address resides within a cache directory (cache hit or cache miss).

Processing commences at 500, whereupon processing looks up a line address corresponding to the cache request in a directory located in software-managed cache 140 (step 510). A determination is made as to whether the directory lookup resulted in a cache hit or a cache miss (decision 520). Again, as those skilled in the art can appreciate, a cache hit occurs when the directory entry includes the expected line address, and a cache miss occurs with the directory entry does not include the expected line address (see code line 320 in FIG. 3 and corresponding text for further details). Software managed cache 140 is the same as that shown in FIG. 1.

If the directory lookup resulted in a cache hit, decision 520 branches to "No" branch 522 whereupon processing sets a retrieval size to zero at step 530. The retrieval size is the amount of data to be transferred during a DMA operation (step 560 below). At step 535, processing sets a query type to "IMMEDIATE," which instructs processing to immediately transfer a data block from the cache line (decision 570 below) instead of waiting for the completion of a DMA operation (see code line 380 in FIG. 3 and corresponding text for further details.

On the other hand, if the lookup resulted in a cache miss, processing branches to "Yes" branch 528 whereupon processing sets a retrieval size to "cache line size" at step 540. The cache line size is the amount of data to fill the cache line, such as 128 bytes. At step 545, processing sets a query type to "WAIT_ALL," which instructs processing to wait until the DMA transfer is complete before reading a data block from the cache line (decision 570 below).

At step 548, processing stores the address in the directory entry to cast out any previous contents. Processing includes the retrieval size (zero bits or cache line size) in a DMA request at step 550. At step 560, processing initiates a DMA request to DMAC 160, which includes the retrieval size. When the retrieval size is zero, DMAC 160 performs a no-op instruction, and when the retrieval size is cache line size, DMAC 160 retrieves a data block from system memory 170 and stores it in a corresponding cache line included in software managed cache 140 (see FIG. 6 and corresponding text for further details). DMAC 160 and system memory 170 are the same as that shown in FIG. 1.

A determination is made as to value of the query type, which was set at steps 535 or 545 depending upon whether the directory lookup resulted in a cache hit or a cache miss (decision 570). If the query type value is "IMMEDIATE," decision 570 branches to "IMMEDIATE" branch 572 whereupon processing returns at 575, signifying no need to wait until the completion of the DMA data transfer.

On the other hand, if the query type value is "WAIT ALL," decision 570 branches to "WAIT ALL" branch 578 whereupon a determination is made as to whether the DMA transfer has completed (decision 580). If the DMA transfer is not complete, decision 580 branches to "No" branch 582, which loops back to continue to check whether the DMA transfer has completed. This looping continues until the DMA transfer has completed, at which point decision 580 branches to "Yes" branch 588 whereupon processing returns at 590.

Figure 6:
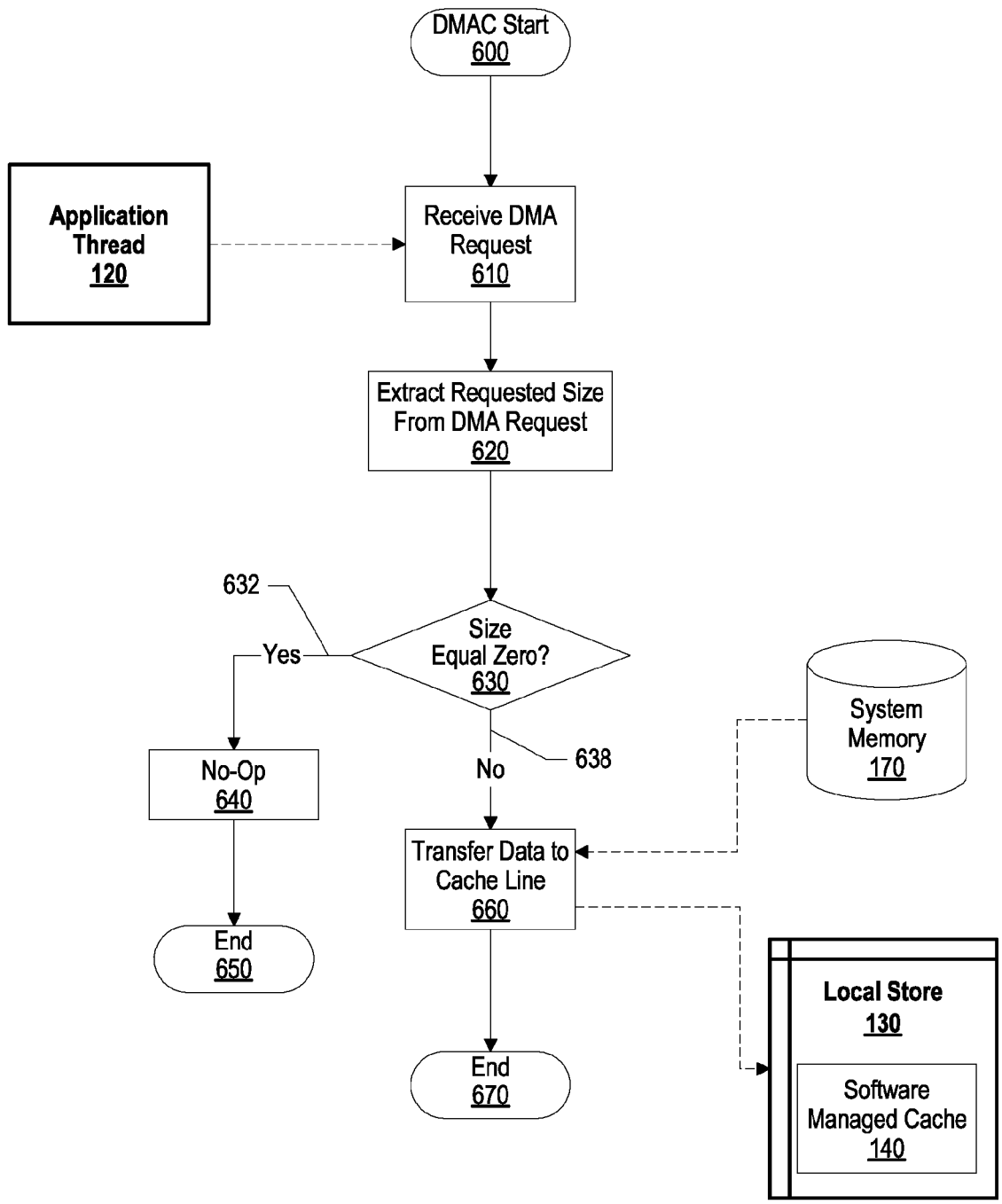
FIG. 6 is a flowchart showing steps taken in a DMA controller processing a DMA request.

FIG. 6 is a flowchart showing steps taken in a DMA controller processing a DMA request. Processing commences at 600, whereupon the DMA controller receives a DMA request from application thread 120 at step 610. The DMA request includes a "requested size" value that is the amount of data that application thread 120 requests (see code line 370 in FIG. 3 and corresponding text for further details). At step 620, the DMA controller extracts the requested size form the DMA request.

A determination is made as to whether the requested size equals zero (decision 630). Application thread 120 includes a requested size of zero when a directory lookup by application thread 120 results in a cache hit (see FIG. 5 and corresponding text for further details). If the requested size equals zero, decision 630 branches to "Yes" branch 632 whereupon the DMA controller performs a no-op instruction at 640, and processing ends at 650.

On the other hand, if the requested size is not zero, but rather a cache line size, decision 630 branches to "No" branch 638 whereupon the DMA controller transfers a data block equal to the cache line size from system memory 170 to software managed cache 140 located in local store 130. Local store 130, software managed cache 140, and system memory 170 are the same as that shown in FIG. 1. Processing ends at 670.

Figure 7:
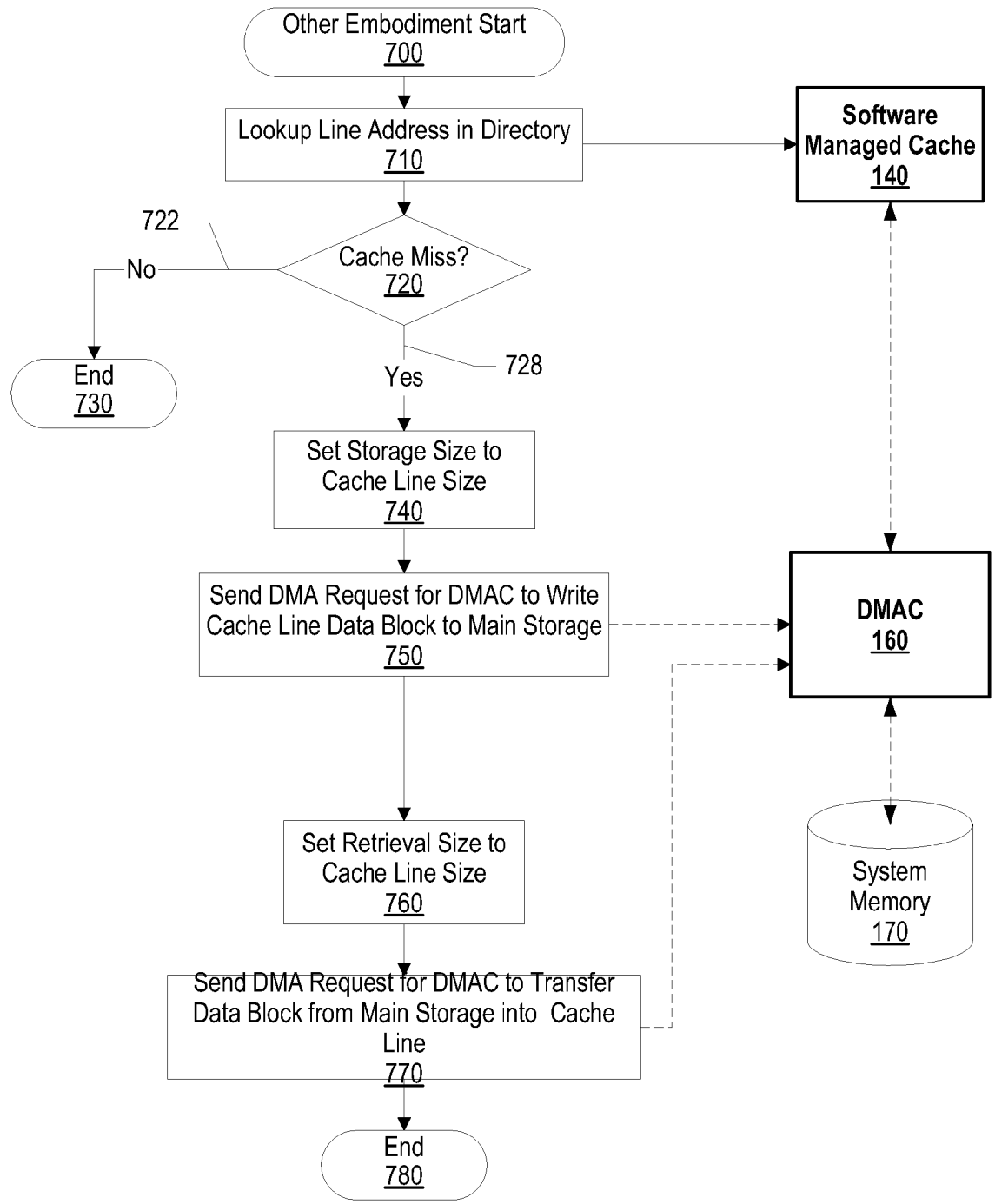
FIG. 7 is a flowchart showing steps taken in an application thread casting out dirty data in a read/write software managed cache.

FIG. 7 is a flowchart showing steps taken in an application thread casting out dirty data in a read/write software managed cache. Processing commences at 700, whereupon processing looks up a line address corresponding to the cache request in a directory located in software-managed cache 140 (step 710). A determination is made as to whether the directory lookup resulted in a cache hit or a cache miss (decision 720). Again, as those skilled in the art can appreciate, a cache hit occurs when the directory entry includes the expected line address, and a cache miss occurs with the directory entry does not include the expected line address. Software managed cache 140 is the same as that shown in FIG. 1.

If the directory lookup resulted in a cache hit, decision 720 branches to "No" branch 722 whereupon processing ends at 730. On the other hand, if the directory lookup resulted in a cache miss (signifying dirty data), decision 720 branches to "Yes" branch 728 whereupon processing begins steps to selectively cast out the prior data block entry by setting a "storage size" to a cache line size, which is the size of the corresponding cache line (step 740). At step 750, processing sends a DMA request, which includes the storage size set in step 740, to DMAC 160 that instructs DMAC 160 to write the corresponding cache line's data block from software managed cache 140 back to system memory 170. Software managed cache 140, DMAC 160, and system memory 170 are the same as that shown in FIG. 1.

At step 760 processing sets a retrieval size to the cache line size and, at step 770, processing sends a DMA request, which includes the retrieval size set in step 760, to DMAC 160 to read a data block from system memory 170 and store the data block in software managed cache 140, all the while maintaining correct ordering with respect to writes and reads. Processing ends at 780.

Figure 8:
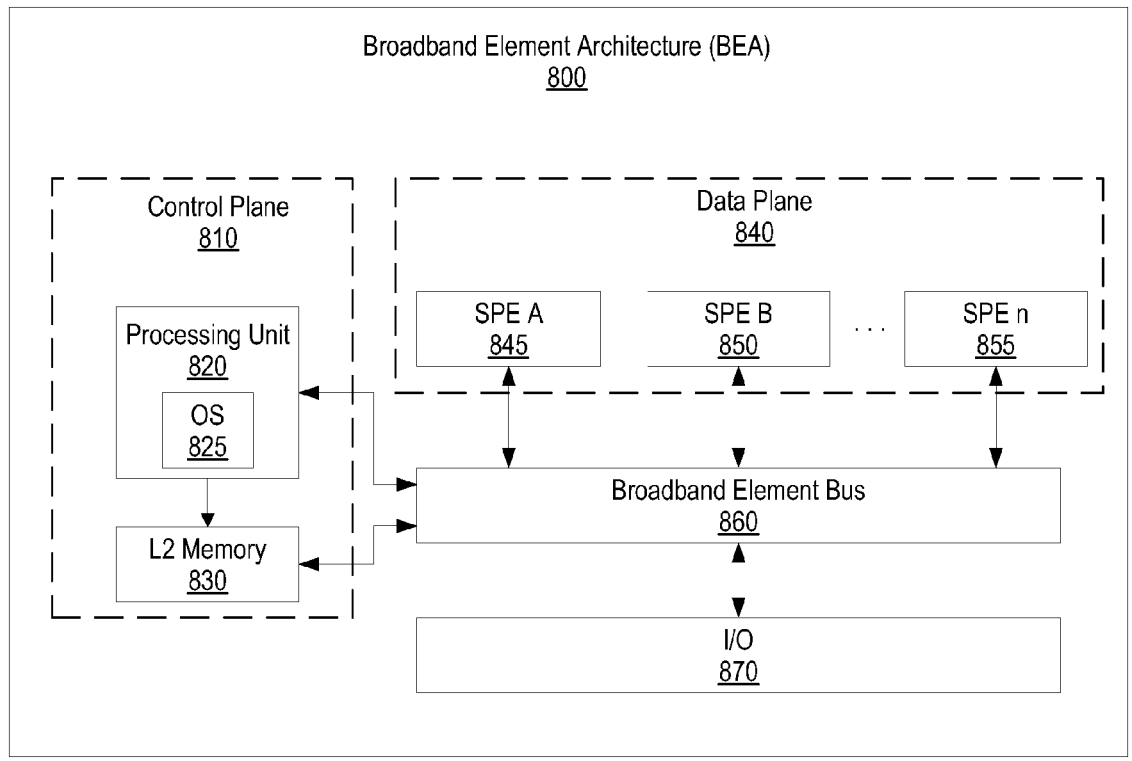
FIG. 8 is a diagram showing a broadband element architecture, which includes a plurality of heterogeneous processors capable of implementing the invention described herein.

FIG. 8 is a diagram showing a broadband element architecture which includes a plurality of heterogeneous processors capable of implementing the invention described herein. The heterogeneous processors share a common memory and a common bus. Broadband element architecture (BEA) 800 sends and receives information to/from external devices through input output 870, and distributes the information to control plane 810 and data plane 840 using processor element bus 860. Control plane 810 manages BEA 800 and distributes work to data plane 840.

Control plane 810 includes processing unit 820 which runs operating system (OS) 825. For example, processing unit 820 may be a Power PC core that is embedded in BEA 800 and OS 825 may be a Linux operating system. Processing unit 820 manages a common memory map table for BEA 800. The memory map table corresponds to memory locations included in BEA 800, such as L2 memory 830 as well as non-private memory included in data plane 840.

Data plane 840 includes Synergistic processing element's (SPE) 845, 850, and 855. Each SPE is used to process data information and each SPE may have different instruction sets. For example, BEA 800 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU) which is a processing core, such as a digital signal processor, a microcontroller, a microprocessor, or a combination of these cores.

SPE 845, 850, and 855 are connected to processor element bus 860, which passes information between control plane 810, data plane 840, and input/output 870. Bus 860 is an on-chip coherent multi-processor bus that passes information between I/O 870, control plane 810, and data plane 840. Input/output 870 includes flexible input-output logic which dynamically assigns interface pins to input output controllers based upon peripheral devices that are connected to BEA 800.

Figure 9:
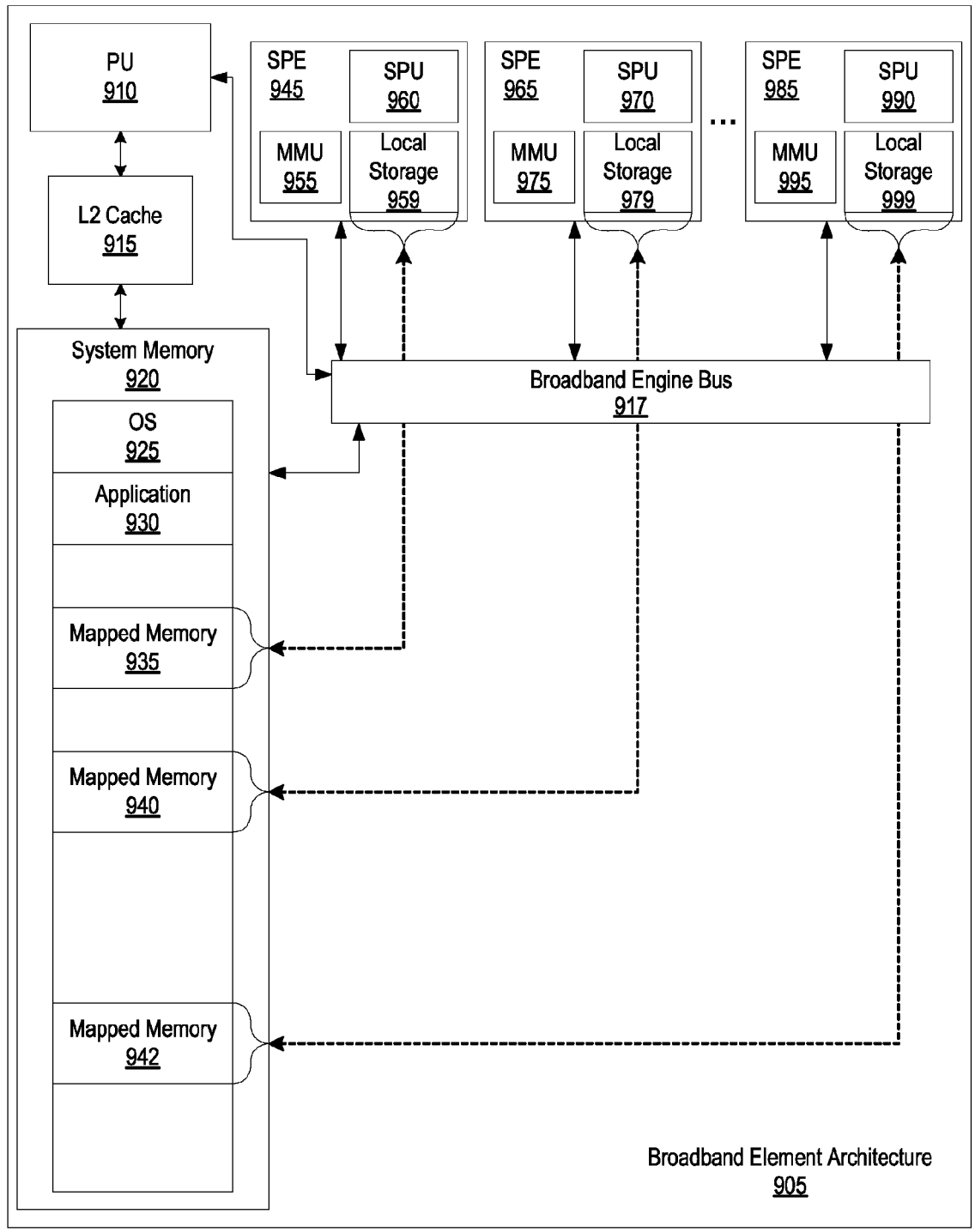
FIG. 9 is a block diagram illustrating a processing element having a main processor and a plurality of secondary processors sharing a system memory.

FIG. 9 is a block diagram illustrating a processing element having a main processor and a plurality of secondary processors sharing a system memory. Broadband Element Architecture (BEA) 905 includes processing unit (PU) 910, which, in one embodiment, acts as the main processor and runs the operating system. Processing unit 910 may be, for example, a Power PC core executing a Linux operating system. BEA 905 also includes a plurality of synergistic processing elements (SPEs) such as SPEs 945 through 985. Each SPE includes a synergistic processing unit (SPU) that act as secondary processing units to PU 910, a memory storage unit, and local storage. For example, SPE 945 includes SPU 960, MMU 955, and local storage 959; SPE 965 includes SPU 970, MMU 975, and local storage 979; and SPE 985 includes SPU 990, MMU 995, and local storage 999.

In one embodiment, the SPEs process data under the control of PU 910. The SPEs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 910 and by the other SPEs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPE may be set up to perform a different task, and accordingly, in one embodiment, each SPE may be accessed using different instruction sets. If BEA 905 is being used in a wireless communications system, for example, each SPE may be responsible for separate processing tasks, such as modulation, chip rate processing, encoding, network interfacing, etc. In another embodiment, each SPE may have identical instruction sets and may be used in parallel to perform operations benefiting from parallel processes.

The shared portion of the SPEs' local stores may be accessed by PU 910 as well as by the other SPEs by mapping each shared region to system memory 920. In one embodiment, PU 910 manages the memory map for the common system memory 920. The memory map table may include PU 910's L2 Cache 915, system memory 920, as well as the SPEs' shared local stores.

A portion of system memory 920 as shown is occupied by the operating system (OS 925). System Memory 925 also contains data 940, which represents data to be processed by SPU 910 as well as by the SPEs. In one embodiment, a process executing on the PU receives a request for a task involving the processing of large data. The PU first determines an optimum method for performing the task as well as an optimum placement of the data in common system memory 920. The PU may then initiate a transfer of the data to be processed from disk 935 to system memory 920. In one embodiment, the PU arranges the data in system memory 925 in data blocks the size of the registers of the SPEs. In one embodiment, the SPEs may have 128 registers, each register being 128 bits long.

The PU then searches for available SPEs and assigns blocks of data to any available SPEs for processing of the data. The SPEs can access the common system memory (through a DMA command, for example) transfer the data to the SPEs' local store, and perform the assigned operations. After processing the data, the SPEs may transfer the data (using DMA again, for example) back to common system memory 920. This procedure may be repeated as SPEs become available until all the data blocks have been processed.

Figure 10:
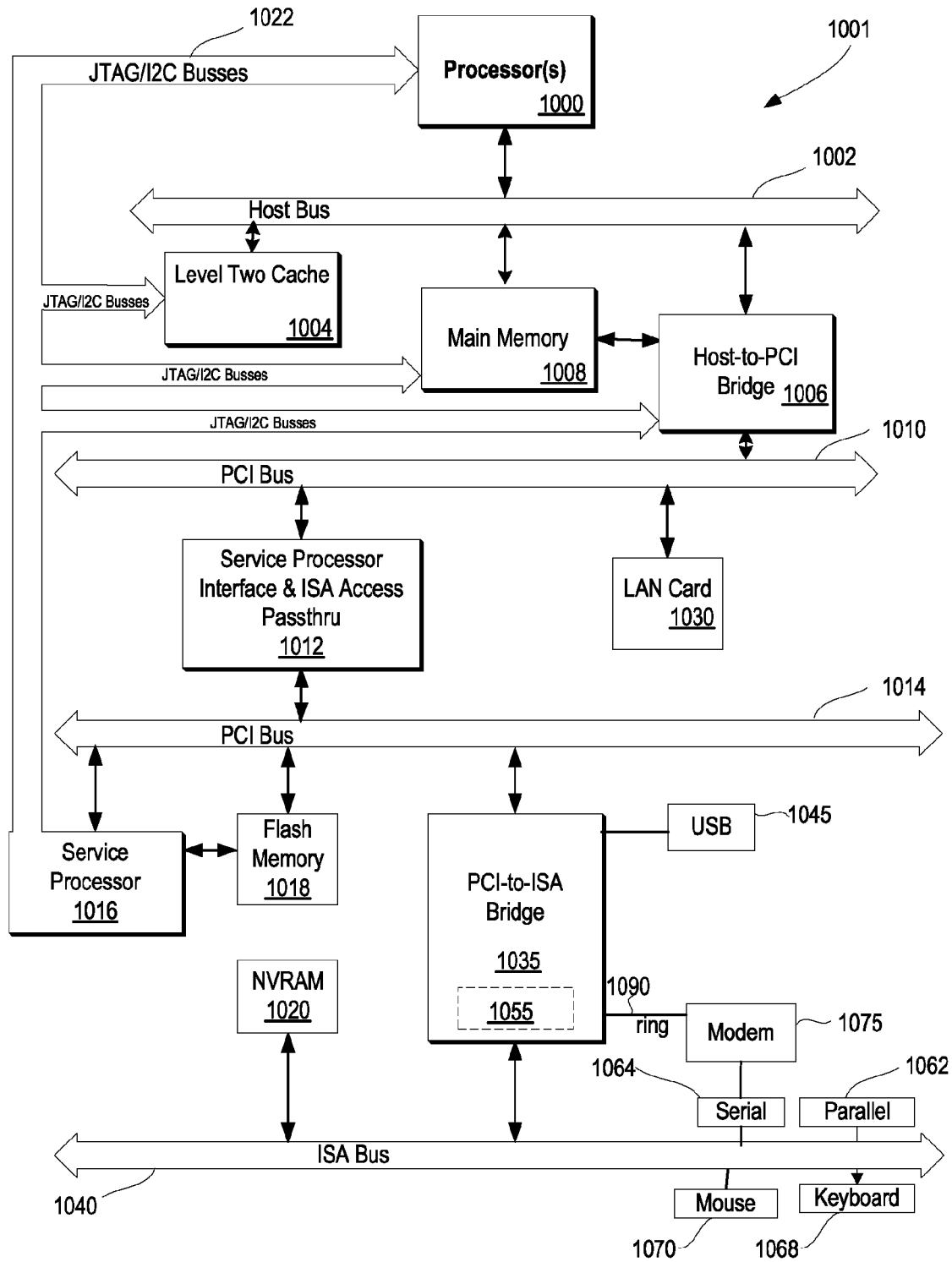
FIG. 10 is a block diagram of a computing device capable of implementing the present invention.

FIG. 10 illustrates information handling system 1001 which is a simplified example of a computer system capable of performing the computing operations described herein. Computer system 1001 includes processor 1000 which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 10105 is connected to serial port 1064 and PCI-to-ISA Bridge 1035.

While FIG. 10 shows one information handling system that employs processor(s) 1000, the information handling system may take many forms. For example, information handling system 1001 may take the form of a desktop, server, portable, laptop, notebook, or other form factor computer or data processing system. Information handling system 1001 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for eliminating a conditional branch instruction in a software managed cache, the method comprising:
   identifying a cache request;
   in response to the identification of the cache request, determining whether a line address corresponding to the cache request is included in a cache directory;
   issuing a DMA request to transfer data to a corresponding cache line regardless of whether the line address is included in the cache directory, the DMA request including a first value retrieval size of zero bits in response to detecting a cache hit when the line address is determined to be in the cache directory, and including a second value retrieval size when the line address is determined not to be included in the cache directory, wherein the first value retrieval size is different than the second value retrieval size;
   retrieving, after the initiation of the DMA request, a data block from the cache line; and
   processing the data block.

2. The method of claim 1 further comprising:
   in response to detecting the cache hit, performing the retrieving prior to completion of a DMA operation corresponding to the DMA request.

3. The method of claim 1 further comprising:
   receiving, at the DMA controller, the DMA request that includes the first value retrieval size of zero bits; and
   performing, at the DMA controller, a no-op instruction in response to the receiving of the DMA request that includes the first value retrieval size of zero bits.

4. The method of claim 2 further comprising:
   in response to detecting the cache hit, setting a query type value to immediate, wherein the retrieval of the data block prior to the completion of the DMA operation is based upon the query type value of immediate.

5. The method of claim 1 further comprising:
   detecting a cache miss in response to determining that the line address is not included in the cache directory;
   in response to detecting the cache miss, setting the second value retrieval size equal to a cache line size during the data transfer, the cache line size corresponding to the size of the cache line; and
   transferring an amount of bits equal to the cache line size to the cache line.

6. The method of claim 5 further comprising:
   in response to detecting the cache miss, waiting for completion of the data transfer before performing the retrieving.

7. The method of claim 5 further comprising:
   in response to detecting the cache miss, setting a query type value to wait all.

8. The method of claim 5 wherein the cache line size is 128 bits.

9. The method of claim 1 wherein the cache directory includes a plurality of directory entries, the method further comprising:
   identifying a directory entry from the plurality of directory entries that correspond to the cache request; and
   storing the line address in the identified directory entry prior to the issuing of the DMA request.

10. A computer program product stored in computer memory, the computer memory containing instructions for execution by a computer, which, when executed by the computer, cause the computer to implement a method for eliminating a conditional branch instruction in a software managed cache, the method comprising:
    identifying a cache request;
    in response to the identification of the cache request, determining whether a line address corresponding to the cache request is included in a cache directory;
    issuing a DMA request to transfer data to a corresponding cache line regardless of whether the line address is included in the cache directory, the DMA request including a first value retrieval size of zero bits in response to detecting a cache hit when the line address is determined to be in the cache directory and including a second value retrieval size when the line address is determined not to be included in the cache directory, wherein the first value retrieval size is different than the second value retrieval size;
    retrieving, after the initiation of the DMA request, a data block from the cache line; and
    processing the data block.

11. The computer program product of claim 10 wherein the method further comprises:
in response to detecting the cache hit, performing the retrieving prior to completion of a DMA operation corresponding to the DMA request.

12. The computer program product of claim 10 wherein the method further comprises:
receiving, at the DMA controller, the DMA request that includes the first value retrieval size of zero bits; and
performing, at the DMA controller, a no-op instruction in response to the receiving of the DMA request that includes the first value retrieval size of zero bits.

13. The computer program product of claim 11 wherein the method further comprises:
in response to detecting the cache hit, setting a query type value to immediate, wherein the retrieval of the data block prior to the completion of the DMA operation is based upon the query type value of immediate.

14. The computer program product of claim 10 wherein the method further comprises:
detecting a cache miss in response to determining that the line address is not included in the cache directory;
in response to detecting the cache miss, setting the second value retrieval size equal to a cache line size during the data transfer, the cache line size corresponding to the size of the cache line; and
transferring an amount of bits equal to the cache line size to the cache line.

15. The computer program product of claim 14 wherein the method further comprises:
in response to detecting the cache miss, waiting for completion of the data transfer before performing the retrieving.

16. The computer program product of claim 14 wherein the method further comprises:
in response to detecting the cache miss, setting a query type value to wait all.

17. The computer program product of claim 14 wherein the cache line size is 128 bits.

18. The computer program product of claim 10 wherein the cache directory includes a plurality of directory entries, the method further comprising:
identifying a directory entry from the plurality of directory entries that correspond to the cache request; and
storing the line address in the identified directory entry prior to the issuing of the DMA request.

19. An information handling system comprising:
one or more processors;
a memory accessible by the processors;
a DMA controller accessible by the processors;
one or more nonvolatile storage devices accessible by the processors; and
an cache management tool for managing cache requests, the cache management tool being effective to:
identify a cache request;
in response to the identification of the cache request, determine whether a line address corresponding to the cache request is included in a cache directory located in the memory;
issue a DMA request to transfer data to a corresponding cache line regardless of whether the line address is included in the cache directory, the DMA request including a first value retrieval size of zero bits in response to detecting a cache hit when the line address is determined to be in the cache directory and including a second value retrieval size when the line address is determined not to be included in the cache directory, wherein the first value retrieval size is different than the second value retrieval size;
retrieve, after the initiation of the DMA request, a data block from the cache line located in the memory; and
process the data block.

20. The information handling system of claim 19 wherein the cache management tool is further effective to:
in response to detecting the cache hit, perform the retrieving prior to completion of a DMA operation corresponding to the DMA request.

21. The information handling system of claim 19 wherein the cache management tool is further effective to:
receive, at the DMA controller, the DMA request that includes the first value retrieval size of zero bits; and
perform, at the DMA controller, a no-op instruction in response to the receiving of the DMA request that includes the first value retrieval size of zero bits.

22. The information handling system of claim 20 wherein the cache management tool is further effective to:
in response to detecting the cache hit, set a query type value to immediate, wherein the retrieval of the data block prior to the completion of the DMA operation is based upon the query type value of immediate.

23. The information handling system of claim 19 wherein the cache management tool is further effective to:
detect a cache miss in response to determining that the line address is not included in the cache directory;
in response to detecting the cache miss, set the second value retrieval size equal to a cache line size during the data transfer, the cache line size corresponding to the size of the cache line; and
transfer an amount of bits equal to the cache line size to the cache line located in the memory.

24. The information handling system of claim 23 wherein the cache management tool is further effective to:
in response to detecting the cache miss, wait for completion of the data transfer before performing the retrieving.

25. The information handling system of claim 23 wherein the cache management tool is further effective to:
in response to detecting the cache miss, set a query type value to wait all.

26. The information handling system of claim 23 wherein the cache line size is 128 bits.

27. The information handling system of claim 19 wherein the cache directory includes a plurality of directory entries, the cache management tool further effective to:
identify a directory entry from the plurality of directory entries that correspond to the cache request; and
store the line address in the identified directory entry located in the memory prior to the issuing of the DMA request.

* * * * *